United States Patent [19]

Sykes et al.

[11] Patent Number: 4,966,283
[45] Date of Patent: Oct. 30, 1990

[54] CASSETTE ALBUM WITH CHANNEL-FORM HINGES AND METHOD

[75] Inventors: Philip K. Sykes, Shoreview; Stephen R. Schmitz, Shakopee, both of Minn.

[73] Assignee: Blackbourn Inc, Eden Prairie, Minn.

[21] Appl. No.: 436,453

[22] Filed: Nov. 14, 1989

[51] Int. Cl.[5] .......................................... B65D 85/672
[52] U.S. Cl. .................................... 206/387; 206/311; 206/312; 206/472; 220/337; 220/339
[58] Field of Search ............... 206/309, 311, 312, 387, 206/444, 472; 220/337, 339

[56] References Cited

U.S. PATENT DOCUMENTS

| | | | |
|---|---|---|---|
| 3,351,270 | 11/1967 | Hohnjec | 220/337 |
| 3,616,487 | 11/1971 | Dearth | 220/337 |
| 3,629,901 | 12/1971 | Wolf | 220/339 |
| 4,341,307 | 7/1982 | Shyers | 206/387 |
| 4,432,827 | 2/1984 | Graetz et al. | 156/245 |
| 4,501,361 | 2/1985 | Rose, Jr. | 206/493 |
| 4,635,797 | 1/1987 | Bankier | 206/472 |
| 4,641,750 | 2/1987 | Johnson et al. | 206/472 |
| 4,681,223 | 7/1987 | Roberts | 220/339 |
| 4,703,853 | 11/1987 | Byrns | 206/387 |
| 4,717,021 | 1/1988 | Ditzig | 206/444 |
| 4,718,550 | 1/1988 | Johnson | 206/387 |
| 4,724,957 | 2/1988 | Burgschweiger | 206/309 |
| 4,784,264 | 11/1988 | Sykes | 206/387 |

FOREIGN PATENT DOCUMENTS

| | | | |
|---|---|---|---|
| 3230987 | 2/1984 | Fed. Rep. of Germany | 206/387 |
| 2503667 | 10/1982 | France | 206/387 |
| 2586498 | 2/1987 | France | 206/387 |
| 2091692 | 8/1982 | United Kingdom | 206/387 |

Primary Examiner—David T. Fidei
Attorney, Agent, or Firm—James V. Harmon

[57] ABSTRACT

The invention provides a vacuum formed cassette album having front and rear covers connected by a spine. The covers and spine are formed from a stiff, self-supporting thermoformed tray sheet extending the height and breadth of both the front and rear covers and across the spine area. A soft cover sheet, formed for example from supple plastic, is sealed to the tray sheet along its edges. At least a pair of parallel, vertically disposed, laterally spaced apart vacuum formed channels are provided in the tray sheet at the edges of the spine and extending to the top and bottom edges of the tray sheet to define fold lines between the spine and the covers. The channel-form hinges are substantially uncompressed. They are of uniform thickness throughout and of the same thickness as the surrounding material of the tray sheet so that when the album is closed the soft cover stock is drawn onto the hinges to provide a smooth contour around the outside edge of the adjacent channel-form hinges which are covered and enclosed by the smoothly contoured cover stock material to present a neat, tailored appearance.

6 Claims, 3 Drawing Sheets

CASSETTE ALBUM WITH CHANNEL-FORM HINGES AND METHOD

FIELD OF THE INVENTION

The invention relates to a book-style album and more particularly to an album formed from plastic material.

BACKGROUND OF THE INVENTION

Attempts have been made previously to improve the life of the hinges of book-style cassette albums. For example, U.S. Pat. No. 4,407,410 describes an album having a spine which is curved so as to bow outwardly providing a rounded back. No hinges are formed at the edges of the spine. The rounded backs, however, are thought by many to present a poor appearance. One objective of the present invention is to provide a tailored, straight back; i.e., a flat, neat looking spine having well defined corners where the edges of the spine intersect the front and rear album covers. This configuration presents a neat, tailored look with good visual appeal and an appearance more similar to that of an ordinary book. A flat spine also presents graphic material more clearly than a round back which distorts the image. Other prior designs such as those described in U.S. Pat. Nos. 4,641,750; 4,718,550 and 4,784,264 provide a flat spine having a good appearance but the hinges, while usually satisfactory, sometimes crack or split. Occasionally, there are complaints about the hinges breaking, particularly if the album is subject to heavy use. In these albums the hinge is formed by pressure exerted against the sheets with a pair of vertically heated bars. When the bars are pressed together on opposite sides of the plastic sheet material, two laterally spaced apart thermally heated hinge rules are formed which define narrow depressions or longitudinal notches in the sheet material. Each spine rule thus comprises a narrow groove or recess of reduced thickness with a raised border of greater thickness on each side as shown in FIG. 5 of U.S. Pat. No. 4,641,750. Such hinge rules form a weak point where breakage can occur. Another difficulty with some of the prior albums is their tendency to pop open prematurely because of residual stresses in the hinges which act as springs tending to open the album. Moreover, the process used in preparing spine rules previously employed also has a tendency to limit production rates.

U.S. Pat. No. 4,635,797 describes a package having two separate trays which are spaced apart from one another in the spine area. The vinyl coated paperboard cover stock material is provided with a pair of embossments to define hinges. Both trays have to be formed, handled and sealed to the cover stock material separately, tending to slow production. It is an object of the present invention to provide an album suited for rapid mass production while providing the strength advantage of having a strong, relatively stiff and durable tray stock material extending through the hinges in the spine area. It is also an object to provide the hinges in the stiff and durable tray material rather than in the relatively soft cover stock material and to conform the soft cover layer over the hinges of the inner tray sheet to provide smooth tailored corners at the fold lines between the spine and the covers of the album.

In view of these deficiencies, it is a major objective of the invention to find a way to provide hinges in a strong inner tray sheet layer. It is another object to provide an album with a soft and supple outer cover stock layer conforming to the relatively firm inner supporting hinges providing square corners along each edge of the spine. Another object is to provide better flexibility of the hinges with less residual stress in the hinge area when the album is in the closed position. A further object is to find a way to increase production rates, thereby lowering manufacturing costs. A further object is to hold cardboard inserts in place without the provision of a spine rule.

These and other more detailed and specific objects of the present invention will be apparent in view of the following description setting forth by way of example but one of the various forms of the invention that will be apparent to those skilled in the art once the principles described herein are understood.

THE FIGURES

SUMMARY OF THE INVENTION

The invention provides a vacuum formed cassette album having front and rear covers connected by a spine. The album is formed from an inner stiff, self-supporting thermoformed tray sheet extending the height and breadth of both the front and rear covers and across the spine area. A soft, supple cover sheet, formed from soft non-self-supporting plastic film or sheet material, is sealed to the tray sheet along its edges. At least a pair of parallel, vertically disposed, laterally spaced apart channel-form hinges are provided are formed in the tray sheet at the edges of the spine and extend to the top and bottom edges of the tray sheet to define fold lines between the spine and the covers. The channel-form hinges are uncompressed and are therefore of uniform thickness throughout and of substantially the same thickness as the surrounding material of the tray sheet. When the album is closed, the soft cover stock layer conforms smoothly around the outside of the underlying channel-form hinges thereby enclosing them to present a neat, tailored appearance.

DETAILED DESCRIPTION OF THE INVENTION

Figure 1:
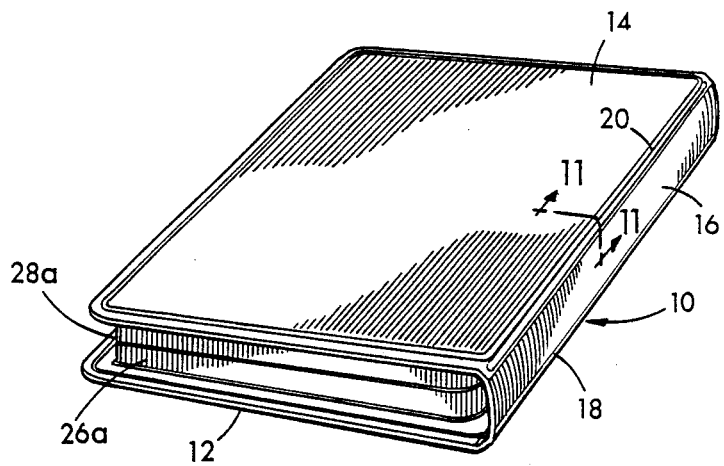
FIG. 1 is a perspective view of an album embodying the invention.
Figure 2:
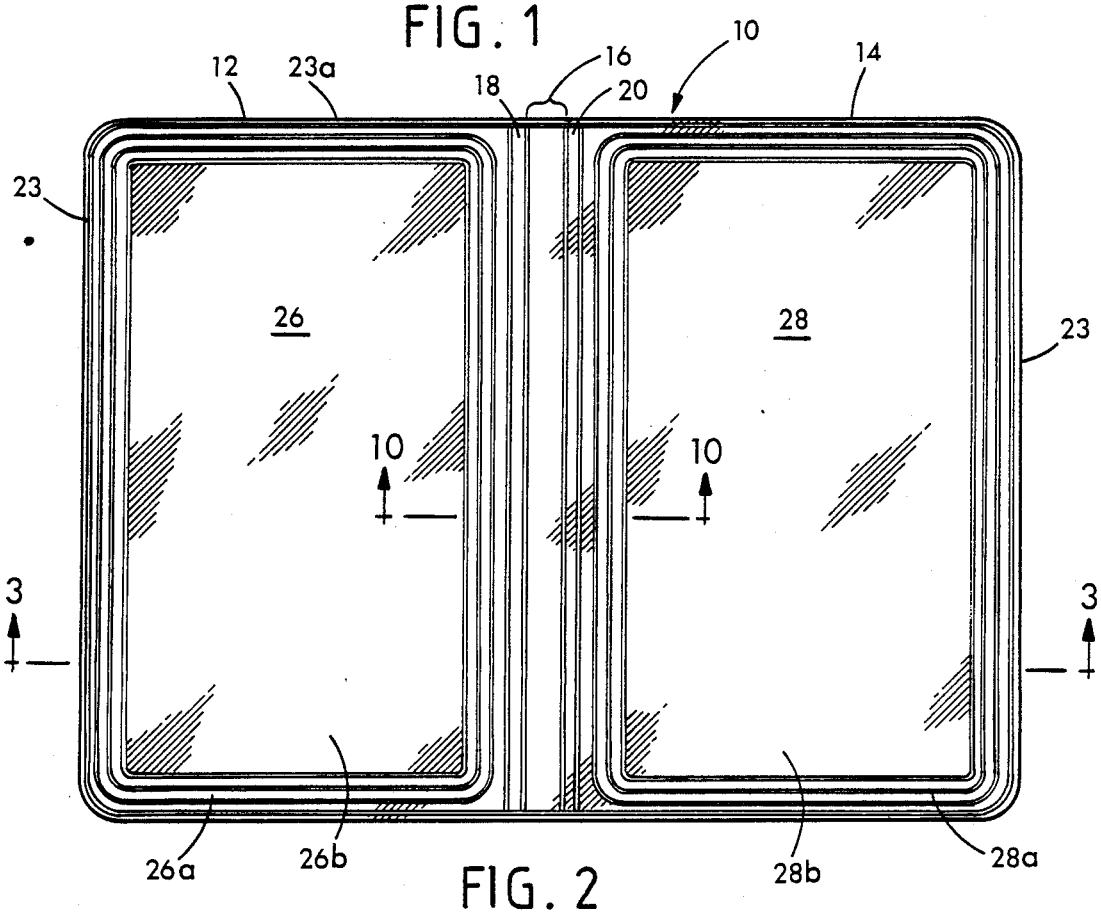
FIG. 2 is an open plan view of the inside of the album.
Figure 3:
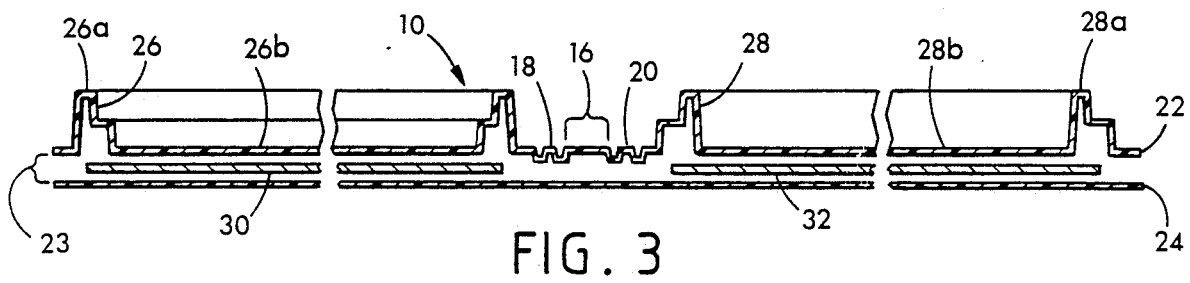
FIG. 3 is an exploded vertical cross-sectional view taken on line 3—3 of FIG. 2.
Figure 4:
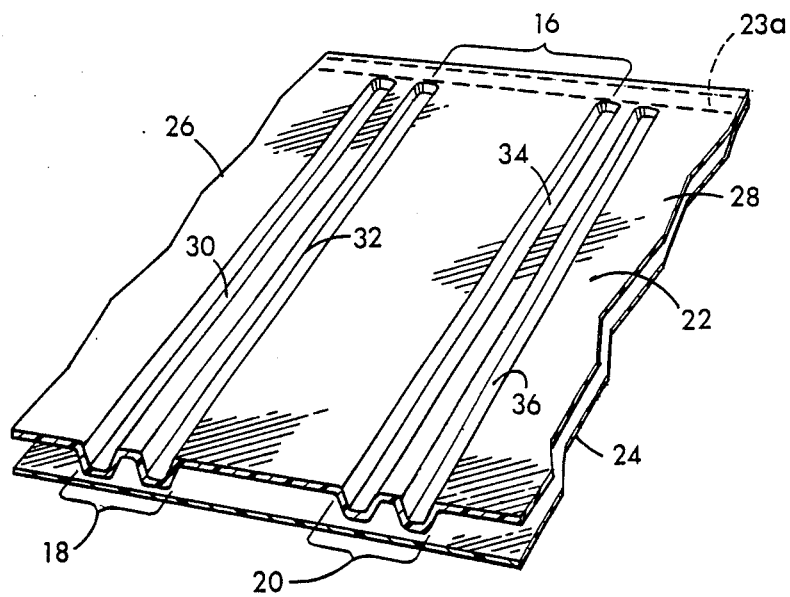
FIG. 4 is a greatly enlarged perspective view of the upper end of the spine of the album and surrounding material.

Shown in FIG. 1-3 is an album 10 having front and rear covers 12 and 14 joined together by means of spine 16. Fold lines or hinges 18 and 20 are provided at the intersection of spine 16 and the covers. As shown in FIG. 3, the album 10 is formed from two major plastic components. The first is an upper tray sheet 22 of relatively stiff plastic material having little if any plasticizer, for example 0.02 inch thick unplasticized polyvinylchloride sheet which is thermoformed, e.g. by vacuum and/or pressure forming. There is in addition a second, outer sheet 24 of the same general size and outline as sheet 22. The outer cover sheet 24 and tray sheet 22 are bonded together at their edges by a thermal bond, i.e. by forcing the edges thereof together under heat and pressure along a seal 23 extending around the top, sides and bottom of the tray sheet 22. The cover sheet 24 is formed from a soft, supple, non-self-supporting plastic sheet material such as a relatively highly plasticized and conformable polyvinylchloride 0.008 inch thick sheet material which can be referred to as a flexible cover stock. When folded, it will easily conform to the contours of the relatively stiff inner tray sheet 22 which acts as a stiffening spine or backing for the cover sheet 24 to present a neat, tailored appearance at the hinges 18, 20. If desired, the periphery can be left unsealed at 23a along its upper edge (FIG. 2) to provide a pocket or trap into which a printed display or title sheet (not shown) can be inserted when required.

As seen in FIGS. 2–5, the tray sheet 22 is formed into a desired configuration, preferably by thermoforming (e.g. by vacuum and/or pressure forming), to define a pair of left and right cooperating and interfitting cassette receiving trays 26 and 28. Tray 26 includes a rectangular tray wall 26a surrounding a rectangular pocket 26b. Similarly, the tray 28 includes a tray wall 28a of rectangular shape surrounding a pocket 28b adapted to mate within the tray wall 26a when the album is closed. Between the trays and the cover sheet 24 can be provided cardboard stiffening sheets 30 and 32 (FIG. 3). It can be seen in FIG. 3 that the hinges at 18 and 20 will also function to help hold the cardboard stiffening sheets 30, 32 in place.

The hinges will now be described in more detail in connection with FIGS. 4–8. Folding of the album covers at each edge of the spine is accomplished by means of channel-form hinges 18, 20 located entirely within the sheet material of the tray sheet 22. Each channel-form hinge 18, 20 is formed in the tray sheet by providing one or more ridges or furrows 30–36 composed of a series of bends or folds in the tray sheet 22. It should be noted that each of the furrows 30–36 is uniform in thickness and that the thickness of the sheet stock at the hinge is substantially the same as the material of the surrounding tray sheet 22. For example, as seen in cross-section, the sheet stock material of a single channel proceeding from left to right bends downwardly then upwardly at the bottom of the channel and horizontally at the right edge of the channel. This provides a furrow or channel formed from material having a constant thickness throughout. It can be seen in FIG. 4 that the channels 30–36 which define the hinges 18 and 20 extend all the way to the top seal 23a when a top seal is provided. Similarly, as shown in FIG. 2, the channels 30–36 extend all the way to the bottom portion of the edge seal 23. While a single channel can be provided, if desired, on each side of the spine 16, optimum performance is achieved with two channels to define each hinge. The double channels formed in the stiff tray material at each hinge are highly beneficial in achieving the performance required of this product. The double channels are also the best configuration for distributing spine stresses effectively.

Figure 6:
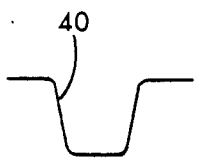
FIG. 6 is a cross-sectional view of an angled channel-form hinge.
Figure 7:
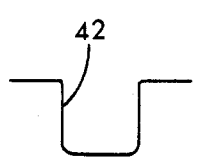
FIG. 7 is a cross-sectional view of a V-shaped channel-form hinge.
Figure 8:
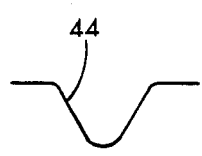
FIG. 8 is a cross-sectional view of a U-shaped channel-form hinge.
Figure 10:
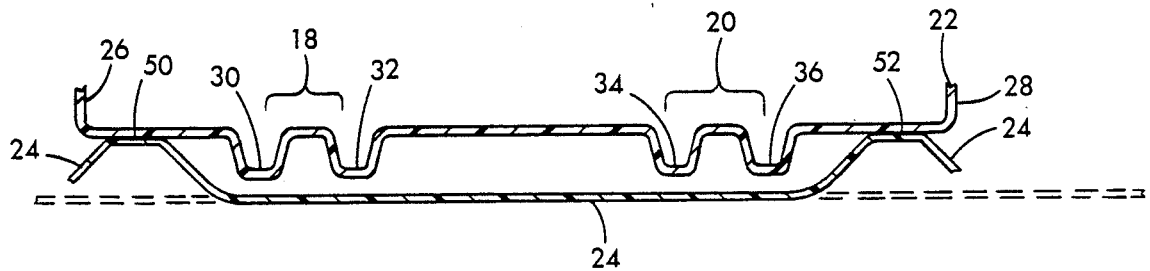
FIG. 10 is a cross-sectional view taken on line 10—10 of FIG. 2 on an enlarged scale.
Figure 11:
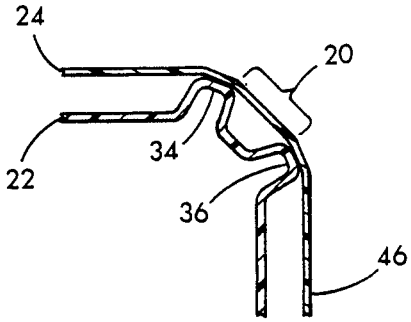
FIG. 11 is a cross-sectional view taken on line 11—11 of FIG. 1 on an enlarged scale.

The hinges can have a variety of shapes. For example, as shown in FIG. 6, the channel 40 has an angled trough shape in which the width diminishes proceeding toward the bottom. FIG. 7 is similar but the width of the trough 42 is constant from top to bottom. In FIG. 8 is shown a trough 44 having a V-shape with a radius at the bottom. As shown in FIG. 10, the cover stock sheet 24 is sealed along parallel, vertically disposed laterally spaced apart seal lines 50 and 52 laterally of the hinges 18 and 20. It should be noted that the seals 50 and 52, when used, are not located at the hinges 18 and 20. As a result, the bending of the album does not take place where the seals 50, 52 are located. If a trap sheet is used, the seals 50, 52 are omitted to allow insertion of the trap sheet through the unsealed top area 23a.

Figure 5:
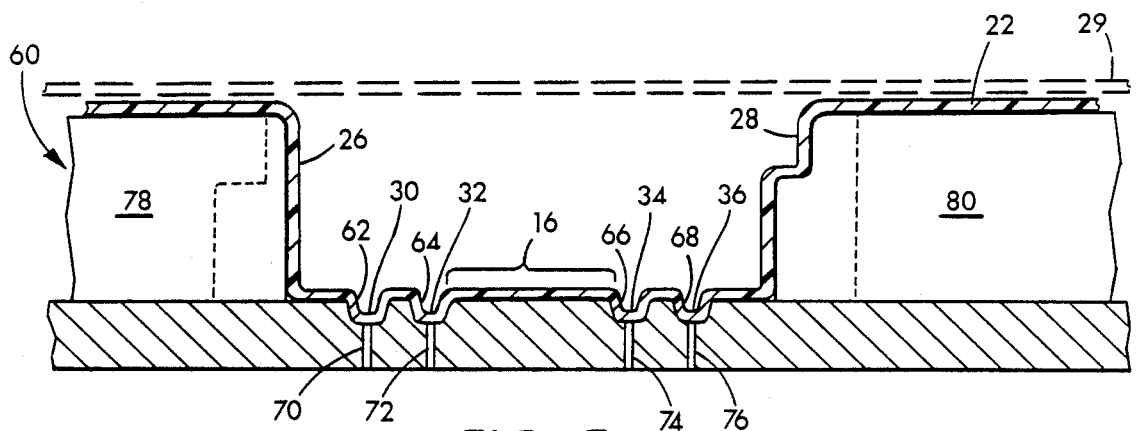
FIG. 5 is a semi-diagrammatic vertical sectional view showing the forming of the album tray.
Figure 9:
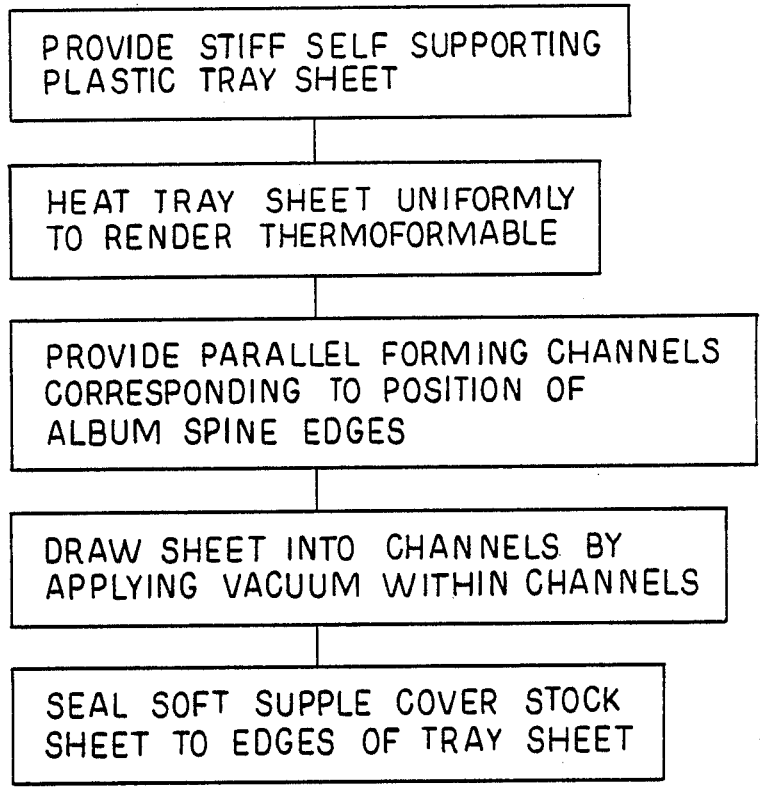
FIG. 9 is a flow chart illustrating the steps in forming an album in accordance with the invention.

A preferred method of manufacturing the hinges 18, 20 will now be described with reference to FIGS. 5 and 9. To begin the process, the relatively stiff self-supporting plastic tray sheet 22 is positioned horizontally as shown by dotted lines in FIG. 5 above a molding form or die 60. The tray sheet 20 is then heated uniformly to render it thermoformable. Within the molding form 60 are provided four parallel longitudinally extending laterally spaced apart forming channels 62–68. Communicating through the forming channels 62–68 are vacuum ports 70–76. Other vacuum ports (not shown) are provided to draw the sheet 22 down into the tray molding sections 78 and 80 of the mold 60. As a vacuum is applied through the ports 70–76, the soft, hot plastic is drawn to the bottom of each of the forming channels 62–68, thereby conforming precisely to the inside contour of the molding form 60. If desired, pressure can be applied to the sheet 22 from above to force it into the forming channels 62–68. It will be seen as a result that the tray sheet stock 22 has a uniform thickness throughout the area of the channels 30–36. The formed tray sheet 22 is then removed from the mold 60 and the soft, supple cover stock sheet 24 is sealed to at least some edges of the tray sheet 22 along seal line 23.

When the album is closed, the supple cover stock material 24 will conform smoothly to the contours of the hinge 20 with the channels 34 and 36 acting as a stiff backbone stretching the soft conformable cover stock material 24 over it to serve as an underlying framework. This provides a neat, tailored and attractive appearance with precise bends at each of the hinges 18, 20 and a flat spine 16 between the hinges. In addition, because the hinges 18, 20 are located entirely within the tray sheet 22 and the seals 50, 52 between the cover stock 24 and the tray sheet 22 are not located at the hinges, the hinges will not be compressed to a thin cross-section as described for example in U.S. Nos. Pat. 4,641,750 and 4,784,264.

The present albums close more reliably with less tendency for stress remaining in the hinges to cause the album to pop open. If desired, the invention can be provided with an open center in the tray walls adjacent the spine to display the cassette title through the spine as described in U.S. Pat. No. 4,784,264.

Manufacture of the present invention is also greatly facilitated because there is no need for a sheet of release paper formerly placed between the inner and outer album sheets when hinges were formed by means of heated stamping bars to provide the spine rule.

Many variations of the present invention within the scope of the appended claims will be apparent to those skilled in the art once the principles described herein are understood.

What is claimed is:

1. A book-style cassette album comprising, front and rear covers connected by a spine, said album including a stiff, self-supporting thermoformed tray sheet extending the height and breadth of both the front and rear covers and across the spine area, at least one of the covers including a tray comprising a portion of the tray sheet having an inwardly deflected wall at least in part surrounding a central pocket adapted to receive a cassette or similar article to be held in the album, at least a pair of parallel vertically disposed laterally spaced apart channel-form hinges within the tray sheet, one such hinge at each edge of the spine and extending proximate to the top and bottom edges of the tray sheet to define fold lines between the spine and each of the covers, each of said channel-form hinges being uncompressed such that the tray sheet is of substantially uniform thickness throughout the channel-form hinge and each channel has substantially the same thickness as the surrounding material of the tray sheet, the hinge at each edge of the spine comprises at least a pair of parallel adjacent channels, a cover sheet formed from a soft, supple non-self-supporting sheet of plastic material sealed to at least some of the edges of the tray sheet and being unsealed to the tray sheet at the channel-form hinges, the supple cover stock conforming to the underlying hinges which act as a stiff framework over which the cover sheet extends when the album is closed to present an attractive tailored appearance along each hinge, the cover sheet also having a uniform thickness throughout the hinge area.

2. The album of claim 1 wherein the tray stock has a greater thickness than the cover stock material.

3. The album of claim 2 wherein the tray stock has a thickness of about 0.02 inches and the cover stock has a thickness of about 0.008 inches and contains a greater amount of plasticizer than the tray stock.

4. The album of claim 1 wherein the cover sheet is sealed to the tray sheet along a pair of vertically disposed seal lines positioned laterally of each of the hinges.

5. The album of claim 1 wherein the tray sheet is formed by being heated to render the tray sheet thermoformable, the heated tray sheet is brought into proximity with a forming mold, the forming mold is provided with elongated forming channels corresponding to the position of the edges of the spine of the album, vacuum and/or pressure is applied to draw the heated sheet material into the forming channels to thereby produce said channel-form hinges while maintaining the thickness of the tray sheet at the hinges substantially the same as the surrounding tray sheet material, the tray sheet is then removed from the forming channels and sealed along at least some of its edges to the soft cover sheet.

6. The album of claim 1 wherein the stiff tray sheet material is formed into said channel-form hinges by first heating the sheet and thereafter conforming the tray sheet to a mold to form the channel-form hinges by producing a series of bends such that the tray sheet when viewed in first bends downwardly, next upwardly and then horizontally to provide a generally U-shaped deflection at each channel channel in the tray sheet.

* * * * *